US006673417B1

(12) United States Patent
Gudet

(10) Patent No.: US 6,673,417 B1
(45) Date of Patent: Jan. 6, 2004

(54) ANTI-SLIP FLOOR TILES AND THEIR METHOD OF MANUFACTURE

(75) Inventor: Christian Pierre Gudet, Crossville, TN (US)

(73) Assignee: Crossville Ceramics Company, Crossville, TN (US)

( * ) Notice: Subject to any disclaimer, the term of this patent is extended or adjusted under 35 U.S.C. 154(b) by 0 days.

(21) Appl. No.: 09/547,740

(22) Filed: Apr. 12, 2000

Related U.S. Application Data

(60) Provisional application No. 60/128,795, filed on Apr. 12, 1999.

(51) Int. Cl.[7] ............................ B32B 3/30; E04E 15/00

(52) U.S. Cl. ....................... 428/156; 428/119; 428/141; 428/220; 238/14; 404/19; 52/177; 4/582; 15/215; 15/238

(58) Field of Search ................................ 428/156, 141, 428/119, 220; 238/14; 404/19; 52/177; 4/582; 15/215, 238

(56) References Cited

U.S. PATENT DOCUMENTS

| | | | | | |
|---|---|---|---|---|---|
| 126,428 | A | * | 5/1872 | Tremeschin | 15/215 |
| 360,928 | A | * | 4/1887 | Tebbutt | 119/525 |
| 452,113 | A | | 5/1891 | Scott | |
| 729,923 | A | * | 6/1903 | Ellis | 15/215 |
| 937,415 | A | * | 10/1909 | Cairns | 280/169 |
| 2,292,368 | A | * | 8/1942 | Gordon | 4/613 |
| 2,366,209 | A | * | 1/1945 | Morris | 156/315 |
| 2,763,049 | A | | 9/1956 | Peebles | |
| 2,825,420 | A | | 3/1958 | Heine | |
| 3,627,861 | A | | 12/1971 | Timke | |
| 3,699,926 | A | * | 10/1972 | Stockl | 119/526 |
| 4,446,190 | A | * | 5/1984 | Pernici | 428/156 |
| 4,715,743 | A | * | 12/1987 | Schmanski | 116/205 |
| 5,053,274 | A | | 10/1991 | Jonas | |
| 5,328,293 | A | | 7/1994 | Keefe | |
| 5,491,015 | A | * | 2/1996 | Reeves et al. | 16/DIG. 12 |
| 5,685,931 | A | | 11/1997 | Kakamu et al. | |
| 5,775,835 | A | * | 7/1998 | Szekely | 104/30 |
| 5,815,995 | A | | 10/1998 | Adam | |
| 5,842,815 | A | * | 12/1998 | Curtis | 404/75 |
| 6,167,879 | B1 | * | 1/2001 | Sievers et al. | 125/1 |
| 6,372,323 | B1 | * | 4/2002 | Kobe et al. | 24/442 |

FOREIGN PATENT DOCUMENTS

DE 3902018 A1 * 7/1990

OTHER PUBLICATIONS

Milligan, "Abrasive Products in the Building Industry", 1935, Industrial and Engineering Chemistry, vol. 27, No. 10, pp. 1123 1124.*

* cited by examiner

*Primary Examiner*—William P. Watkins, III
(74) *Attorney, Agent, or Firm*—Hunton & Williams LLP

(57) ABSTRACT

Anti-slip floor tiles are provided which are textured with a pattern of spikes. The spikes are preferably pyramidal or conical in shape. The height, angle, and base width of the spikes are important to slip resistance coefficients. Preferred spike dimensions range from about 0.2 to about 3.0 mm in height and from about 0.8 to about 3.0 mm in base width (or diameter). Further, a process for manufacturing an anti-slip floor tile which is textured with a pattern of spikes is provided. The tile is manufactured by pressing a powder on a mold, drying the resulting tile, and then firing the pressed tile at a high temperature. The surface texture is formed by the punch of the mold press which includes spike shaped indentations being the negative of the surface of the tile.

22 Claims, 12 Drawing Sheets

ANTI-SLIP FLOOR TILES AND THEIR METHOD OF MANUFACTURE

RELATED APPLICATIONS

This application claims priority from provisional application, Serial No. 60/128,795, filed Apr. 12, 1999, the entire contents of which are incorporated herein by reference in a manner consistent with this application.

FIELD OF THE INVENTION

The present invention relates to anti-slip floor tiles and their method of manufacture.

BACKGROUND OF THE INVENTION

Ceramic floor tiles and other hard floor surfaces are easily maintained and withstand heavy traffic, but such floors can be slippery when soiled or wet. This problem is especially dangerous for floors in doorways, kitchens, and bathrooms where soil, such as oil, grease, sand, or water, can be deposited onto the floor. A minimum floor tile slip resistance coefficient of approximately 0.20 to 0.25 is required to prevent slipping. That coefficient can be measured following the American Society for Testing and Materials ("ASTM"), Standard Testing Procedure ("STP") F-1677-96. See *Measurement of Slip Between the Shoe and Ground During Walking*; Perkins, P. J., ASTM STP 649, pp. 71–87 (1978) for a general discussion of slip resistance coefficients, which is herein incorporated by reference in a manner consistent with this disclosure. Accordingly, research has been conducted on anti-slip floor materials. Such floor materials previously available are prepared, for example, by embedding abrasive foreign particles (i.e., particles made from a material different than that of the hard floor) on the surface layer of the hard floor, or by covering the hard floor surface with a flexible continuous rubbery sheet with random deformable or compressible rubbery particles distributed throughout the rubbery sheet.

Abrasive particles can be incorporated into certain floor surfaces by mixing sand, aluminum oxide, carbide particles, or another grit in paint or glaze and painting or glazing the floor surface with the mixture. Abrasive particles having a composition different from that of the floor surface can also be included in the floor surface such that the particles protrude from the floor surface. In either case the abrasive particles tend to wear and detach from the surface with time. Additionally, the concentration of the particles on the surface varies randomly, thereby resulting in non-uniform results.

U.S. Pat. Nos. 3,227,604, 4,239,797 and 4,336,293, for example, disclose floor materials having grit or particles embedded in or distributed throughout the surface layer. These materials have the drawback that the surface layer, if worn by walking, no longer retains non-slip properties. Furthermore, the embedded particles tend to separate from the surface with time.

U.S. Pat. No. 3,676,208 to Griffin discloses a floor surface wherein glass spheres are incorporated into a surface adhesive film. An epoxy-type resin containing a significant concentration of minuscule solid spheres, such as glass beads, is coated onto a floor surface. This grit-containing epoxy mixture increases the slip resistance of the floor, but it is believed that it does not provide sufficient slip resistance when heavily coated with water or grease.

U.S. Pat. No. 3,030,251 discloses non-slip sheet articles comprising an essentially-continuous, flexible, readily-deformable, rubbery underlying matrix within which a multitude of discrete flexible resilient non-adhesive particles are distributed. However, the particles are not exposed. While the particles have lower abrasion resistance than the matrix layer, they are non-adhesive and are therefore easily releasable.

An object of the present invention is to overcome the foregoing drawbacks of conventional floor materials and to provide anti-slip floor tiles having high durability, uniform performance, and high slip resistance coefficients.

A further object of the present invention relates to a method for manufacturing anti-slip floor tiles having high durability, uniform performance, and high slip resistance coefficients.

SUMMARY OF THE INVENTION

The anti-slip floor tiles of the present invention are textured with a pattern of spikes. The spikes can be spaced in any suitable pattern which results in an adequate slip resistance coefficient (i.e., a slip resistance coefficient of at least about 0.20, preferably at least about 0.25) under any use condition (i.e., dry, wet, greasy or greasy/wet). For a tile of this invention which is greasy/wet (i.e., greasy and wet) the adequate slip resistance coefficient is also at least about 0.20, preferably at least about 0.25. In contrast some tiles of the prior art have slip resistance coefficient of as low as about 0.13 under greasy/wet conditions. Further, the tiles of this invention maintain slip resistance coefficients of at least about 0.20, preferably at least about 0.25 under greasy/wet conditions even after simulated wear. The distance between adjacent spikes (also referred to herein as "distance between spikes") can range from about 5 mm to about 20 mm, with the minimum distance between spikes being about 5 mm. In a preferred embodiment of the invention, the spikes are spaced in a substantially uniform pattern with about 11 mm between adjacent spikes.

The spikes are preferably pyramidal or conical in shape. Further, the top of the spike can optionally be shaped so as to produce a substantially flat upper surface. The height and base width of the pyramidal spikes (or the height and diameter of the conical spikes) are important to slip resistance coefficients. Preferred spike dimensions range from about 0.2 to about 3.0 mm in height and from about 0.8 to about 3.0 mm in base width for pyramidal spikes. For conical spikes, preferred spike dimensions range from about 0.2 to about 3.0 mm in height and from about 0.8 to about 3.0 mm in diameter. Whenever reference is made herein to a height and base width (or diameter) of the spikes, it is intended to reference the height and base width of the pyramidal-shaped spikes or the height and diameter of the conical-shaped spikes. The spike angle (i.e., the angle of a sidewall of the spike with respect to the horizontal plane of the base of the spike as shown in the Figures) is defined by the height and base width (or diameter) of the spikes.

Another embodiment of the invention is drawn to a process for manufacturing anti-slip floor tiles which comprise an exterior surface that is textured with a pattern of spikes, preferably a substantially uniform pattern of spikes, said process comprising the steps of:

a) pressing a suitable powder composition on a mold, said mold comprising an upper punch, a mold frame, a lower punch, and a filler box, thereby forming a pressed tile, b) extracting said pressed tile from said mold, and c) firing the resulting pressed tile to form said anti-slip floor tile wherein the surface texture is formed from the upper punch of the mold which includes spike-shaped indentations.

DETAILED DESCRIPTION OF THE PREFERRED EMBODIMENTS

Figure 1A:
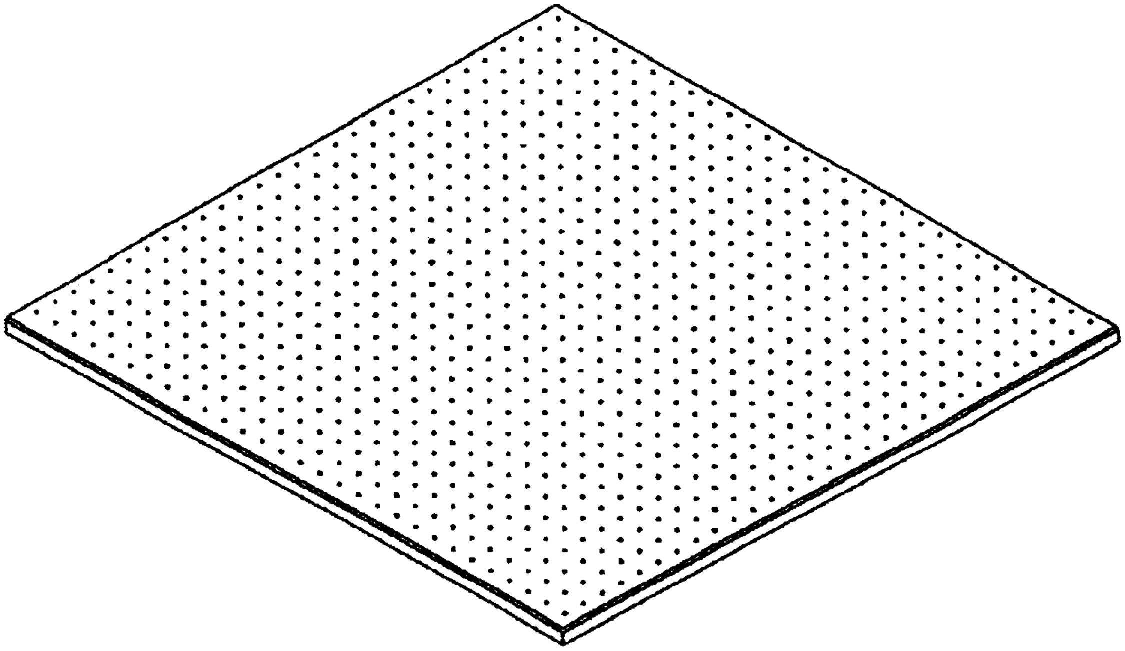
FIGS. 1A–1B: general top view of a tile surface pattern of one embodiment of the invention with FIG. 1A showing that embodiment at a scale of 1:1, and FIG. 1B showing an enlargement at a scale of 1:3.

The anti-slip floor tile of the invention includes an exterior surface which is textured with a pattern of spikes. The anti-slip floor tiles of the invention can be manufactured from any suitable materials known in the art. By way of example, the anti-slip floor tiles can be made from fiberglass or they may be ceramic. For instance, the tile can be formed from a suitable powder composition, preferably a composition which will form a ceramic or a porcelain tile, comprising a mixture of clay, china-clay, feldspar, and silica in varying proportions, as generally known in the art. The powder composition is spray-dried and then pressed in a mold. The mold produces a tile of a desired shape, which is then fired. The most preferred powder composition for manufacturing the anti-slip floor tiles of the invention is that which will produce a porcelain tile.

As is known to those skilled in the art, a porcelain tile is harder, stronger, and more impervious to water and stains than other ceramic compositions. Furthermore, the porcelain tile does not require a coating of glaze on the surface of the tile. A porcelain tile is usually made from a ceramic powder composition wherein 99% of its particles have the size less than about 45 μm (i.e., 99% of the particles are sieved through 325 mesh size). The sieved ceramic powder composition is then pressed at a pressure of about 400 to about 600 kg/cm$^2$, and the pressed tile is fired at a temperature greater than about 1200° C., preferably at a temperature of from about 1220° C. to about 1240° C., to form the porcelain tile.

The tile can also be formed from any mixture of ingredients known in the art which produces a porcelain or a ceramic tile. Such suitable mixtures and their relative proportions are described, for example, in, *From Technology Through Machinery To Kilns For SACMI Tile* (1986) and in *Fine Porcelain Stoneware Tiles, technology, production, marketing*; Biffi, Giovanni, which are herein incorporated by reference in a manner consistent with this disclosure. Chapter IV A of the SACMI publication is directed to the production of porcenalized ceramic stonewear.

The tile of the present invention is textured with a pattern of spikes. The spikes are formed on the surface of the tile body from the same composition as the body, rather than being attached to the surface by a glaze or being formed from differing materials, as in the prior art. The spikes can be spaced in any suitable pattern which results in adequate slip resistance coefficients. The distance between the adjacent spikes is at least about 5 mm, it can range from about 5 mm to about 20 mm, and it is preferably about 11 mm. In a preferred embodiment of the invention, the spikes are spaced in a substantially uniform pattern with about 11 mm between adjacent spikes.

The shape of the spikes formed on the surface of the tile can vary from a pyramid with triangular faces to a conical shape. Optionally, the sidewall edges and/or apex of the spike can be rounded to reduce the sharpness of the spike. Preferably, the spikes are pyramidal in shape and comprise at least three faces, preferably from three to eight faces, and more preferably eight faces. The height, angle, and base width of the pyramidal spikes (or the height, angle, and diameter of the conical spikes) are important to slip resistance coefficients. As height and steepness of the spike increases, the slip resistance coefficient increases. However, along with an increase in slip resistance, there is a decrease in spike strength and the spike is more prone to chipping. On the other hand, spike strength and stability increase and the slip resistance coefficient decreases as the width (or diameter) of the spike base is increased. As will be apparent to those skilled in the art, as the steepness of the spike increases, the spike angle (i.e., the angle of a sidewall of the spike with respect to the horizontal plane of the base of the spike) decreases. The spike angle can range from about 105 to about 150°. Preferred spike dimensions range from about 0.2 to about 3.0 mm in height and from about 0.8 to about 3.0 mm in base width (or diameter). Particularly preferred spike dimensions are 1.2/1.73, 1.2/2.078, 1.2/2.428 and 1.2/2.775 (height/base width (or diameter), all in mm).

In another embodiment of the invention, the spikes are pyramidal shaped with the top edges of the pyramid tuuncated to form substantially flat-top spikes, as shown in FIGS. 10A–10D. In such embodiment, the spike preferably has a height of 0.9 mm. Particularly preferred flat-top spike dimensions are 0.9/1.73, 0.9/2.08, 0.9/2.43, and 0.9/2.78 (height/base width, all in mm). Conically-shaped spikes having substantially flat-top spikes are also contemplated. Conically-shaped flat-top spikes have substantially the same dimensions as pyramidal shaped substantially flat-top spikes, i.e., height of 0.9 mm, with particularly preferred dimensions of 0.9/1.73, 0.9/2.08, 0.9/2.43, and 0.9/2.78 (height/diameter, all in mm). The truncated surface of a substantially flat-top spike may be flat, i.e., parallel to the base (as shown in FIGS. 10A–10D), or it may be inclined at an angle, e.g., about 5 to about 70°, preferably about 5 to about 45° with respect to a plane parallel to the base of the spike. The truncated surface may be produced in any suitable manner, e.g., by shaving off the top of the spike or designing the mold so that it will produce the truncated surface. Again, the sidewall edges and/or apex of the spike can optionally be rounded.

All of the spike, space between the spikes, and base dimensions referred to herein are the dimensions of the respective elements prior to firing the tile and are all based on the dimensions of the mold used to form the tile, unless otherwise indicated. After firing, the dimensions of the respective elements shrink in size from about 8% to about 10%, and generally about 9%, as is known in the art.

The tile body itself can be any size and shape useful in the art. For example, square-shaped tiles having dimensions ranging from about 4×4 (length×width, both in inches) to about 18×18 (length×width, both in inches) can be used. A particularly preferred tile is square in shape with the dimensions of about 197×197×8 (length×width×thickness, all in mm) after firing.

Figure 1B:
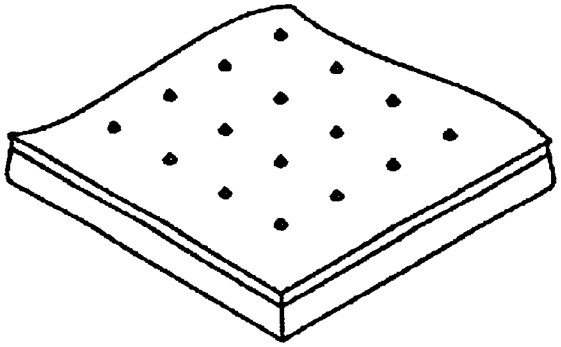
Figure 2A:
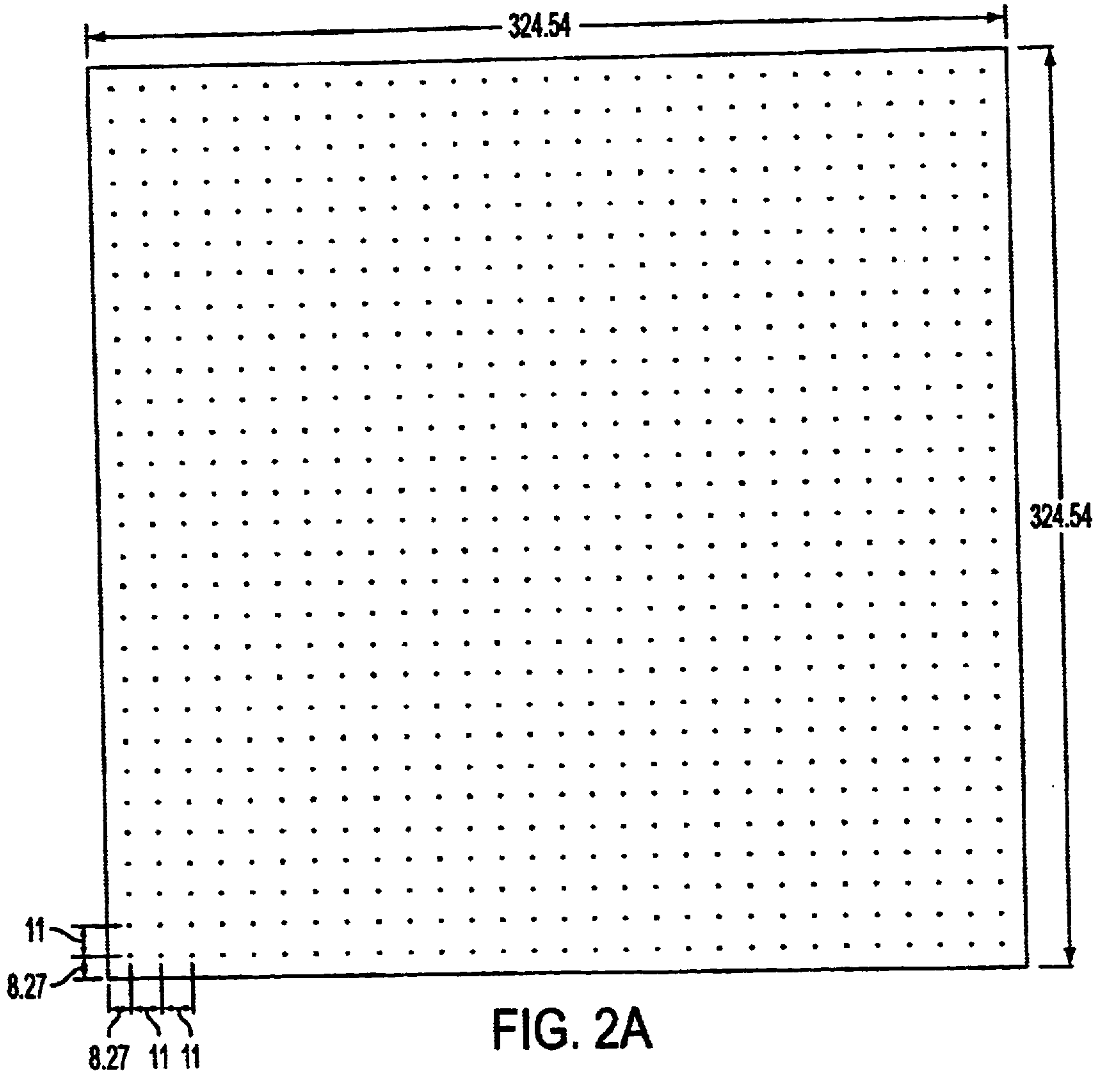
FIGS. 2A–2E: views of the 1.2/1.73 (height/base width of the spike, both in mm) tile with FIG. 2A showing a top view of that tile, FIG. 2B showing a cross-section of that tile, FIG. 2C showing a top view of an individual spike demonstrating the base width of the spike, FIG. 2D showing an enlarged side view of a partial cross-section of the tile with the measurement of the height of the spikes, and FIG. 2E showing an enlarged schematic view of a spike with the dimensions of the spike.
Figure 2B:
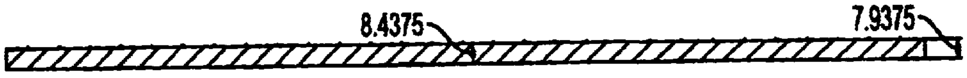
Figure 2C:
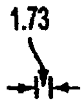
Figure 2D:
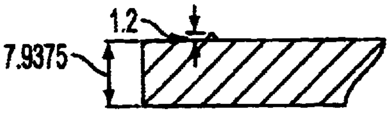
Figure 2E:
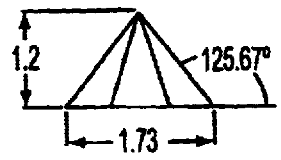
Figure 3A:
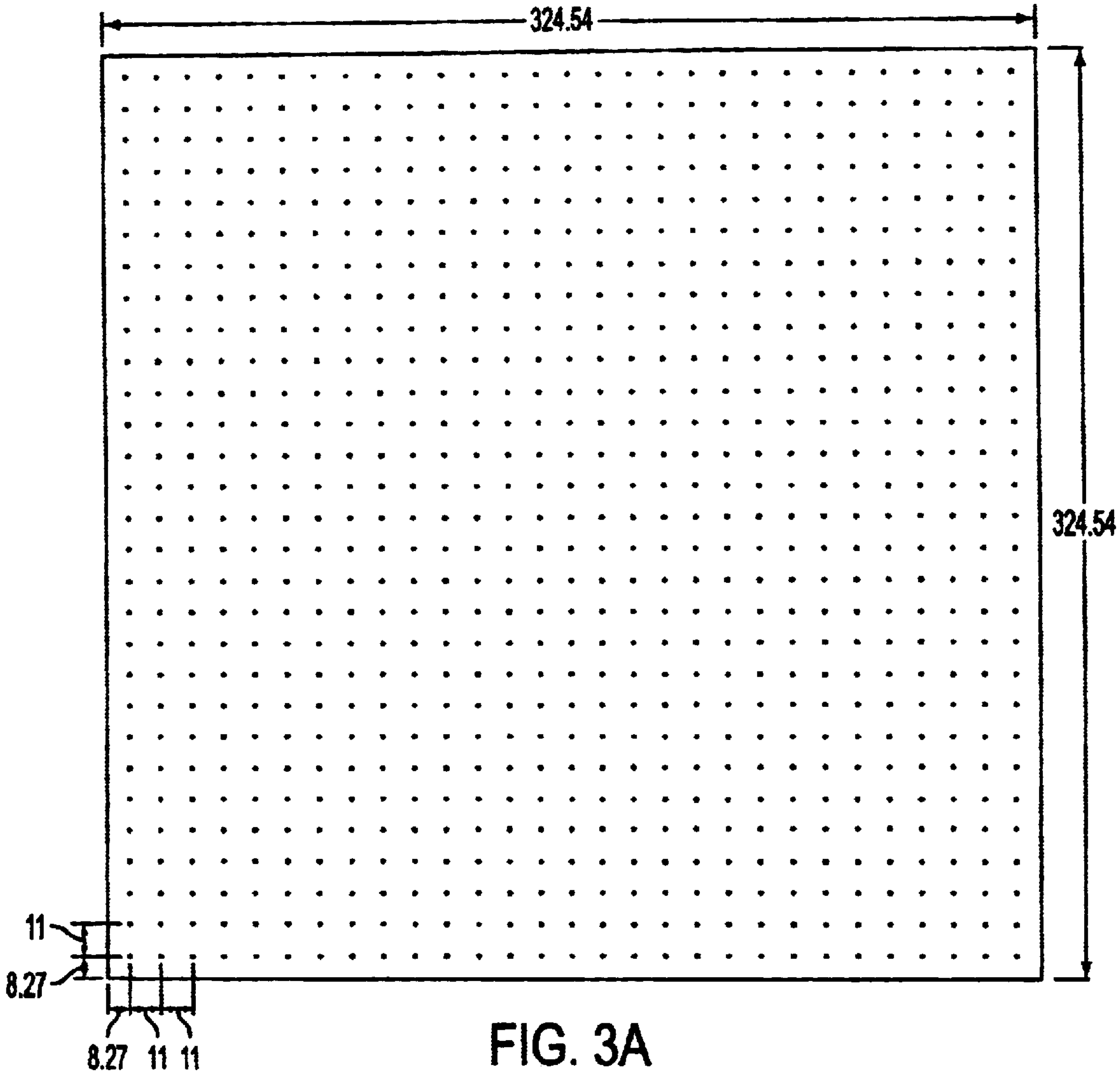
FIGS. 3A–3E: views of the 1.2/2.078 (height/base width of the spike, both in mm) tile with FIG. 3A showing a top view of that tile, FIG. 3B showing a cross-section of that tile, FIG. 3C showing a top view of an individual spike demonstrating the base width of the spike, FIG. 3D showing an enlarged side view of a partial cross-section of the tile with the measurement of the height of the spikes, and FIG. 3E showing an enlarged schematic view of a spike with the dimensions of the spike.
Figure 3B:
Figure 3C:
Figure 3D:
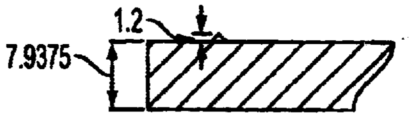
Figure 3E:
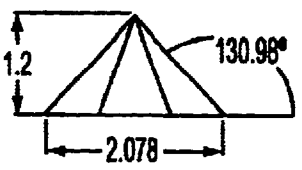
Figure 4A:
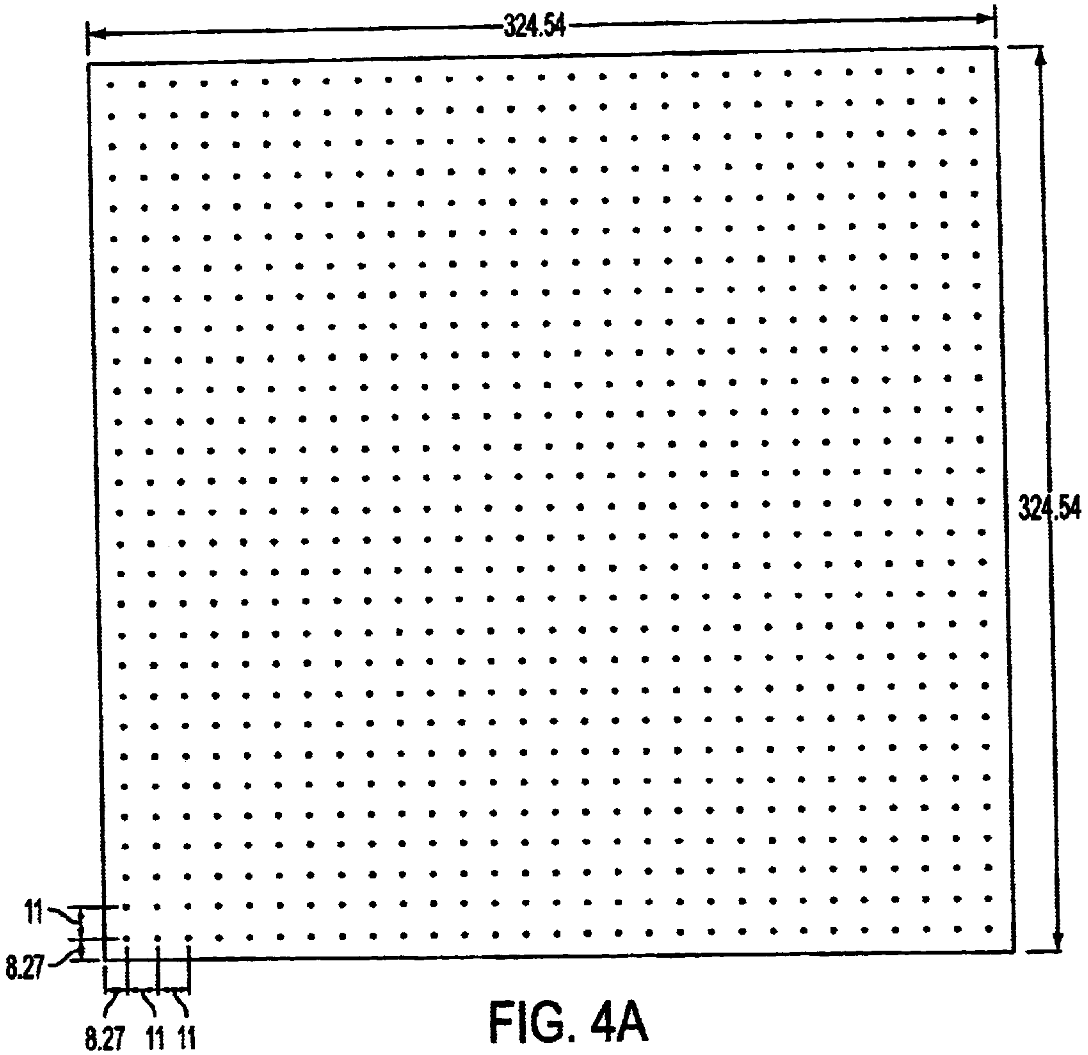
FIGS. 4A–4E: views of the 1.2/2.428 (height/base width of the spike, both in mm) tile with FIG. 4A showing a top view of that tile, FIG. 4B showing a cross-section of that tile, FIG. 4C showing a top view of an individual spike demonstrating the base width of the spike, FIG. 4D showing an enlarged side view of a partial cross-section of the tile with the measurement of the height of the spikes, and FIG. 4E showing an enlarged schematic view of a spike with the dimensions of the spike.
Figure 4B:
Figure 4C:
Figure 4D:
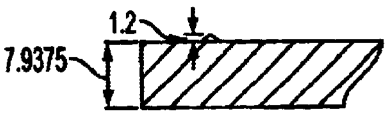
Figure 4E:
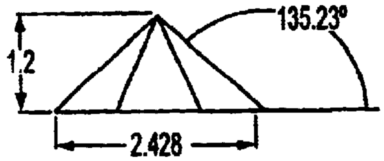
Figure 5A:
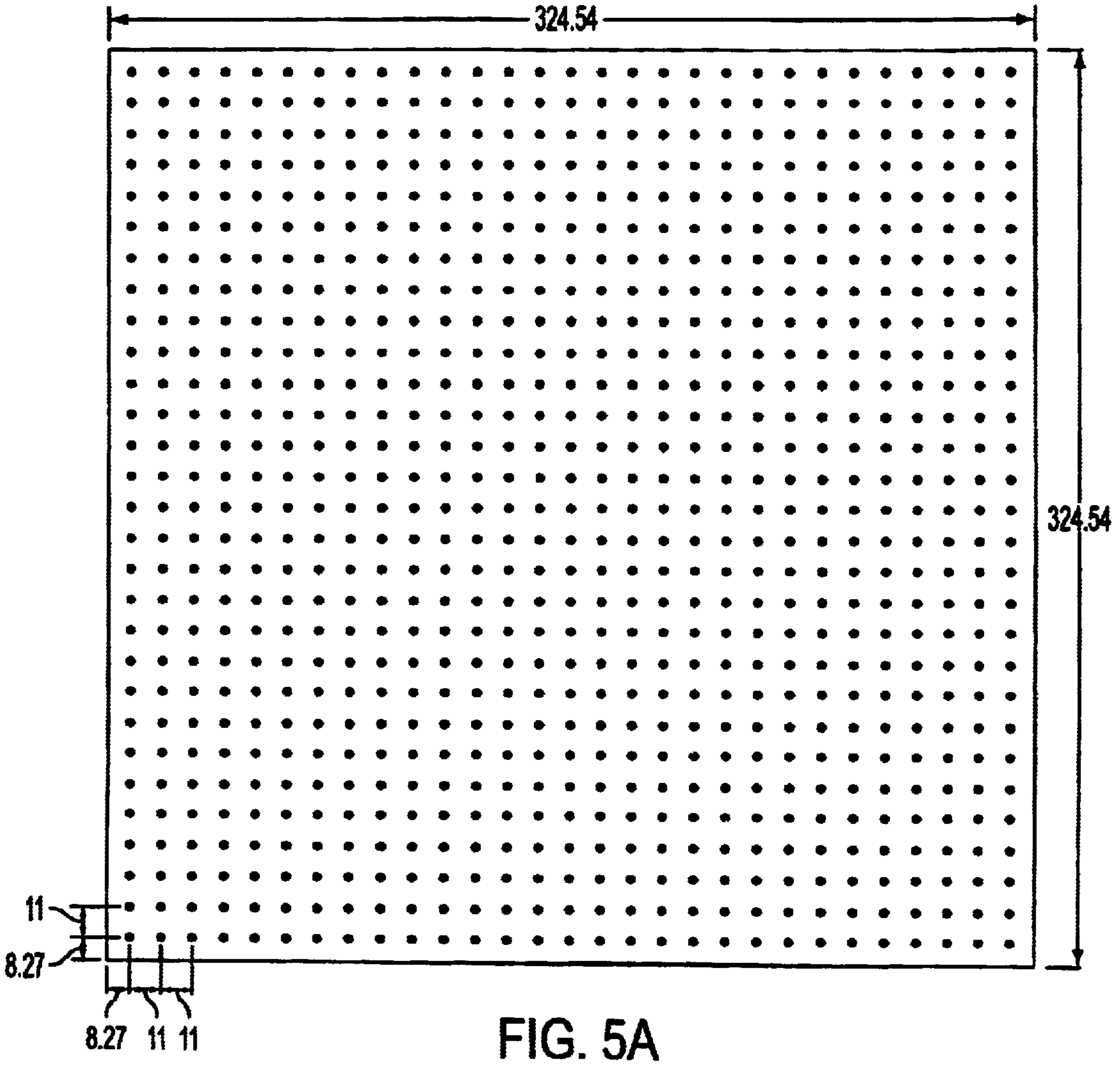
FIGS. 5A–5E: views of the 1.2/2.775 (height/base width of the spike, both in mm) tile with FIG. 5A showing a top view of that tile, FIG. 5B showing a cross-section of that tile, FIG. 5C showing a top view of an individual spike demonstrating the base width of the spike, FIG. 5D showing an enlarged side view of a partial cross-section of the tile with the measurement of the height of the spikes, and FIG. 5E showing an enlarged schematic view of a spike with the dimensions of the spike.
Figure 5B:
Figure 5C:
Figure 5D:
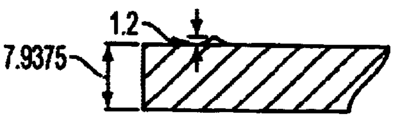
Figure 5E:
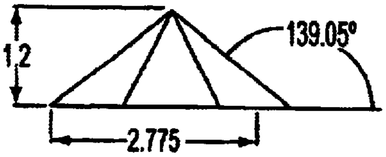
Figure 6A:
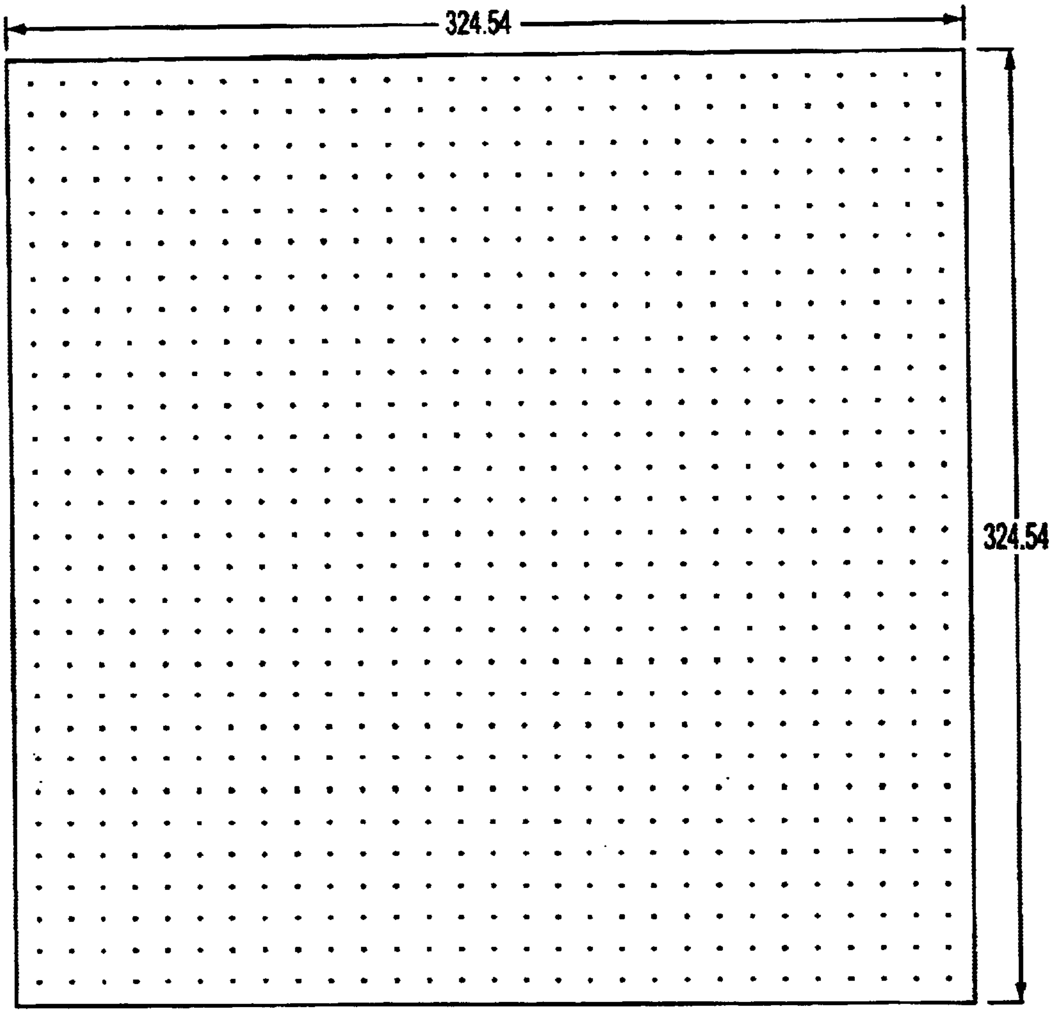
FIGS. 6A–6E: views of the 1.5/1.7315 (height/base width of the spike, both in mm) tile with FIG. 6A showing a top view of that tile, FIG. 6B showing a cross-section of that tile, FIG. 6C showing a top view of an individual spike demonstrating the base width of the spike, FIG. 6D showing an enlarged side view of a partial cross-section of the tile with the measurement of the height of the spikes, and FIG. 6E showing an enlarged schematic view of a spike with the dimensions of the spike.
Figure 6B:
Figure 6C:
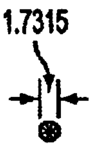
Figure 6D:
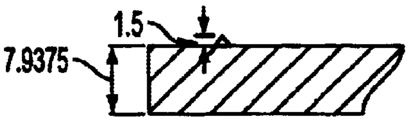
Figure 6E:
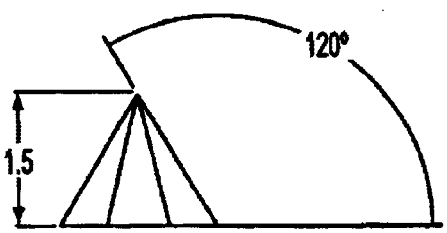
Figure 7A:
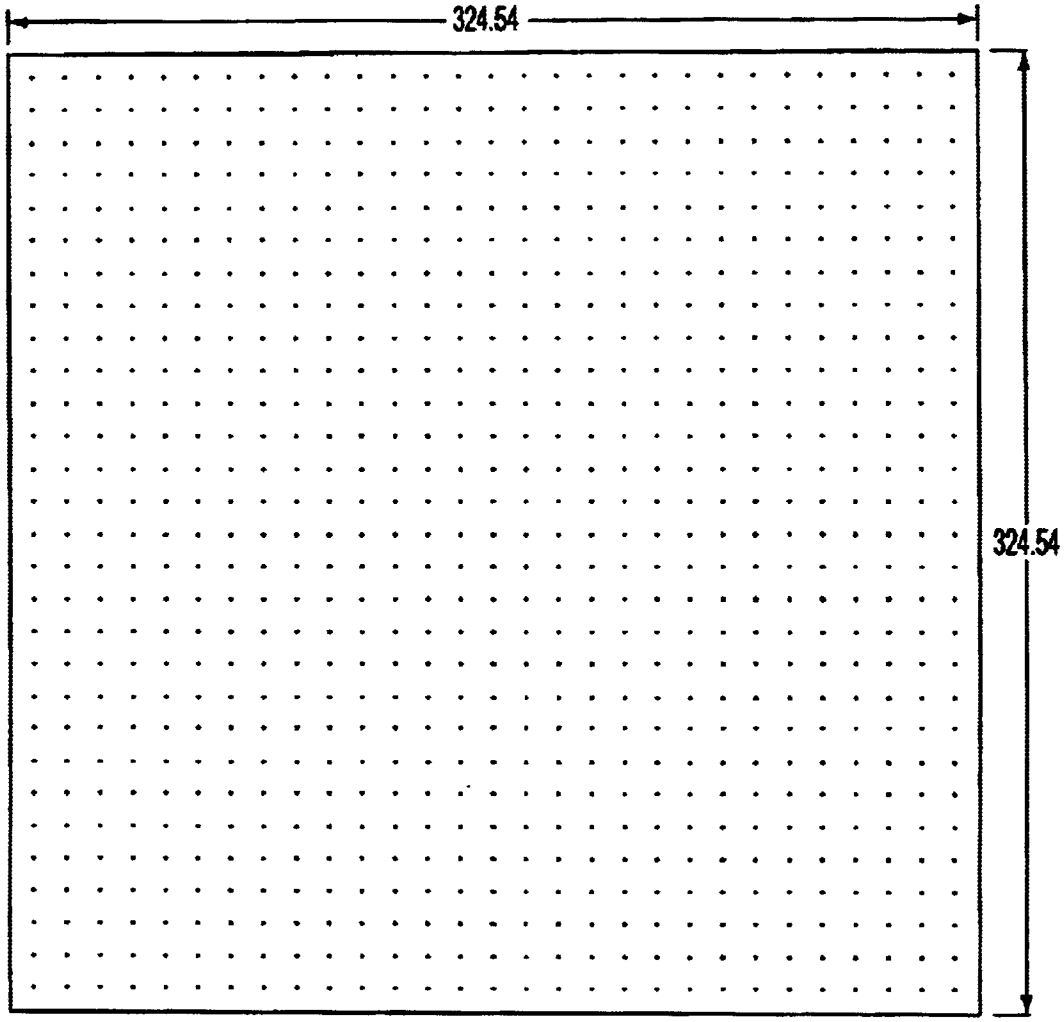
FIGS. 7A–7E: views of the 1.2/1.3857 (height/base width of the spike, both in mm) tile with FIG. 7A showing a top view of that tile, FIG. 7B showing a cross-section of that tile, FIG. 7C showing a top view of an individual spike demonstrating the base width of the spike, FIG. 7D showing an enlarged side view of a partial cross-section of the tile with the measurement of the height of the spikes, and FIG. 7E showing an enlarged schematic view of a spike with the dimensions of the spike.
Figure 7B:
Figure 7C:
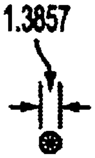
Figure 7D:
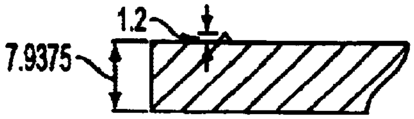
Figure 7E:
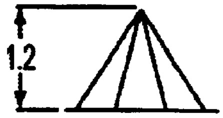
Figure 8A:
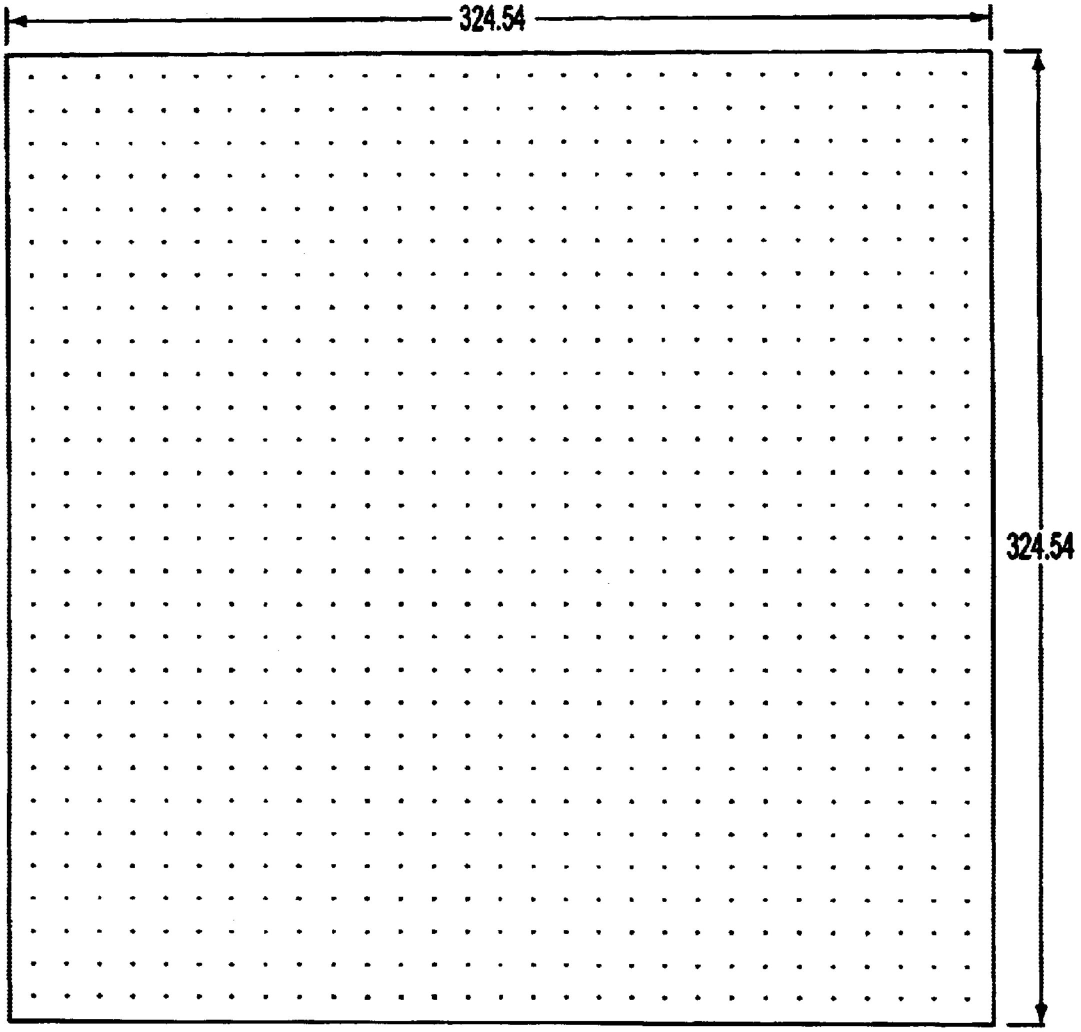
FIGS. 8A–8E: views of the 0.9/1.0389 (height/base width of the spike, both in mm) tile with FIG. 8A showing a top view of that tile, FIG. 8B showing a cross-section of that tile, FIG. 8C showing a top view of an individual spike demonstrating the base width of the spike, FIG. 8D showing an enlarged side view of a partial cross-section of the tile with the measurement of the height of the spikes, and FIG. 8E showing an enlarged schematic view of a spike with the dimensions of the spike.
Figure 8B:
Figure 8C:
Figure 8D:
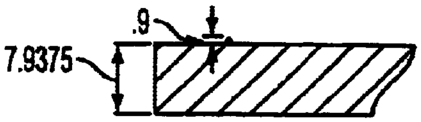
Figure 8E:
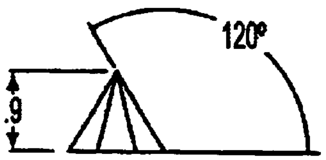
Figure 9A:
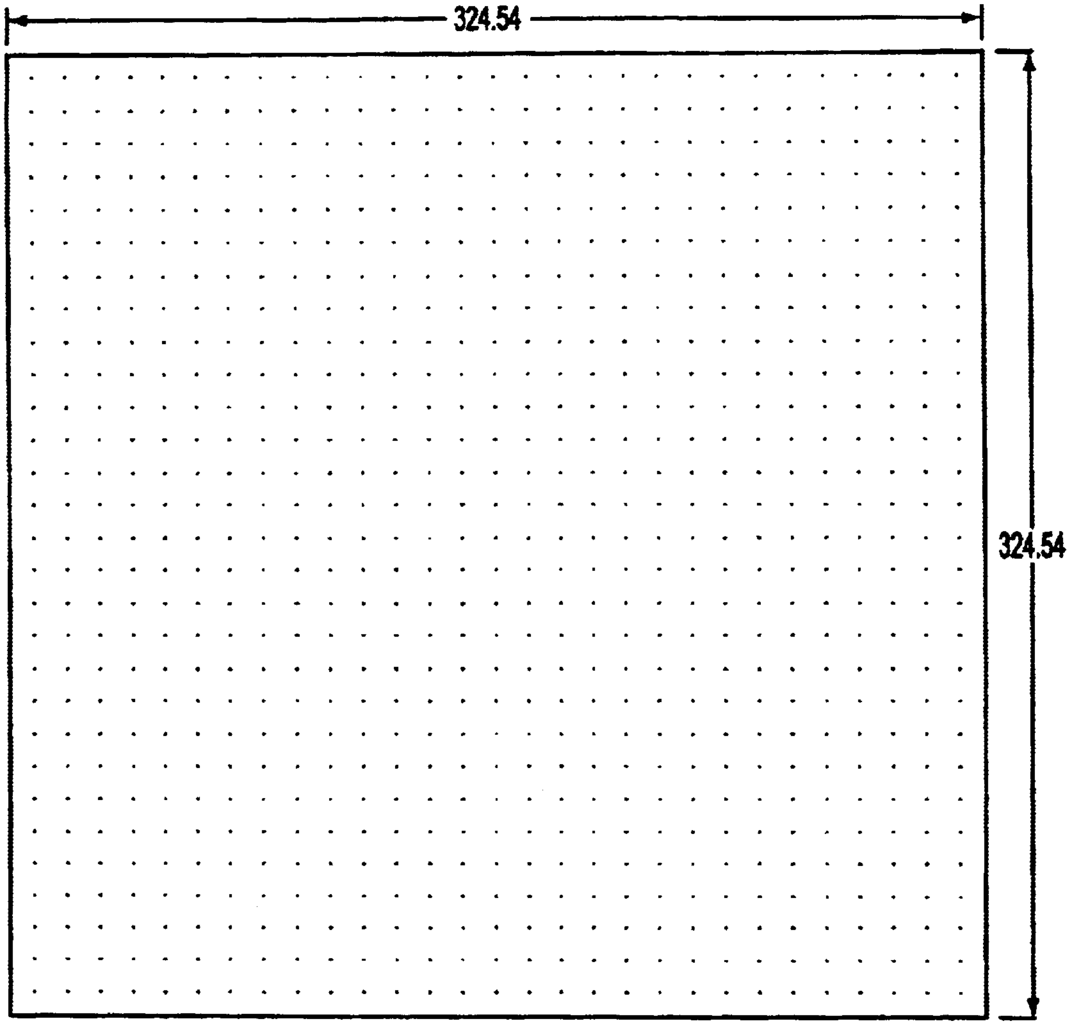
FIGS. 9A–9E: views of the 0.6/0.6928 (height/base width of the spike, both in mm) tile with FIG. 9A showing a top view of that tile, FIG. 9B showing a cross-section of that tile, FIG. 9C showing a top view of an individual spike demonstrating the base width of the spike, FIG. 9D showing an enlarged side view of a partial cross-section of the tile with the measurement of the height of the spikes, and FIG. 9E showing an enlarged schematic view of a spike with the dimensions of the spike.
Figure 9B:
Figure 9C:
Figure 9D:
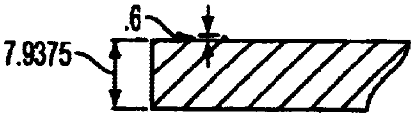
Figure 9E:
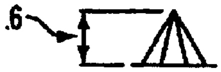
Figure 10A:
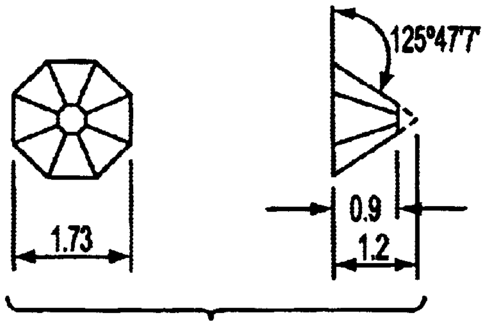
FIGS. 10A–10D: Illustrate substantially flat-top pyramidal spikes with preferred dimensions of the spikes.
Figure 10B:
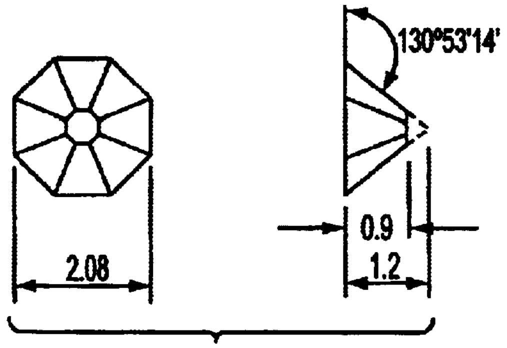
Figure 10C:
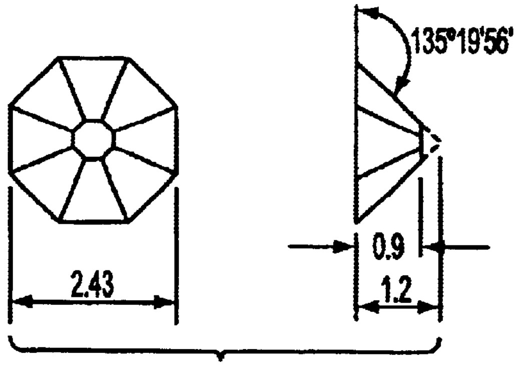
Figure 10D:
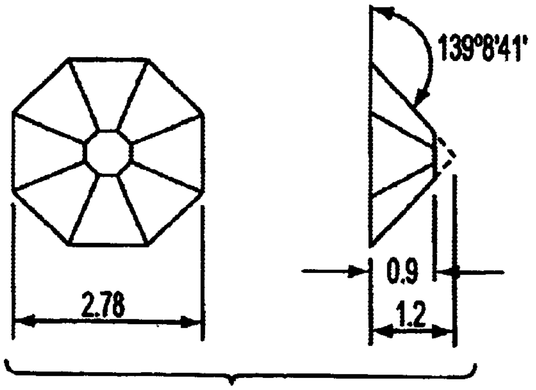

FIGS. 1A and 1B show the general, shape and texture pattern of a preferred embodiment of the present invention, wherein the tile includes spikes of a pyramidal shape. Each of the pyramids has a height of 1.5 mm and eight faces of substantially the same shape and dimensions. FIGS. 2A–9E illustrate other preferred tiles with detailed views of preferred pyramidal shaped spikes. Specifically, FIGS. 2A–2E illustrate a top view of a tile of the invention prior to firing, having the dimensions of 324.54 mm in length and 324.54 mm in width (FIG. 2A), a cross-section of that tile including a multitude of substantially uniformly spaced spikes, with each spike comprising a pyramidal shape and eight faces of substantially the same shape and dimensions. The figures illustrate the tile including the dimensions of 8.475 mm in external thickness and 7.9375 mm in internal thickness (FIG. 2B), a top view of an individual spike illustrating the base width (1.73 mm) of the spike (FIG. 2C), an enlarged side view of a partial cross-section of the tile with the measurement of the height (1.2 mm) of the spikes (FIG. 2D), and an enlarged schematic view of a spike, showing the dimensions of the spike including the angle of inclination (125.67°) of each face of the pyramidal shaped spike (FIG. 2E).

FIGS. 3A–3E, 4A–4E, 5A–5E, 6A–6E, 7A–7E, 8A–8E, and 9A–9E show embodiments of the anti-slip floor tile of the invention with the same perspectives and illustrations shown in FIGS. 2A–2E and with the height and base width (and sometimes angles of inclination) shown for the spikes of a given individual embodiment (i.e., the tile of each respective set of the Figures. The "set of the FIGS." means, e.g., FIGS. 3A–3E or 5A–5E.). In the respective embodiments illustrated in FIGS. 1A–1B, 2A–2E, 3A–3E, 4A–4E, 5A–5E, 6A–6E, 7A–7E, 8A–8E, and 9A–9E, each of the tiles includes an array of spikes, the spikes on each tile having substantially the same shape (i.e., a pyramid with eight faces of substantially the same shape and size), dimensions, and angles as the other spikes on the tile. Nonetheless, it is within the scope of the invention to include on a single tile a plurality of spikes with at least some of the spikes having different shapes, dimensions, and angles than other spikes on the same tile. Similarly, the spikes shown in the Figures are arranged substantially symmetrically on the respective tiles and are substantially equally spaced from each other. It is within the scope of the invention to have the spikes spaced in any desired pattern or randomly, with varying distances between the spikes, so long as an adequate slip resistance coefficient is maintained.

The tile can be manufactured by pressing a suitable powder composition, such as those described above, on a mold to form a pressed tile, drying the resulting pressed tile, and then firing the pressed tile at a temperature of about 1200° C. to about 1250° C. The surface texture is formed by the punch of the mold press which includes spike shaped indentations being the negative of the surface of the tile. The punch is made of hardened steel and coated with a very resistant rubber coating, which includes the spike indentations. By way of example, the rubber coating preferably comprises polyurethane and can be formed from UREPAN 600, a toluene diisocyanate ("TDI") modified polyester manufactured by Bayer, Inc., as described in the Bayer Publication *UREPAN—Processing Guidelines* which is a supplement to the general brochure on UREPAN (Order No.: PU 52098e) both of which are herein incorporated by reference in a manner consistent with this disclosure. Alternatively, the rubber coating can include ADIPRENE, a polyurethane resin believed to be manufactured by Uniroyal Chemical Corp. and believed to be distributed by Uniroyal Chemical Corp. and/or E.I. DuPont DeNemours & Co.

Figure 11:
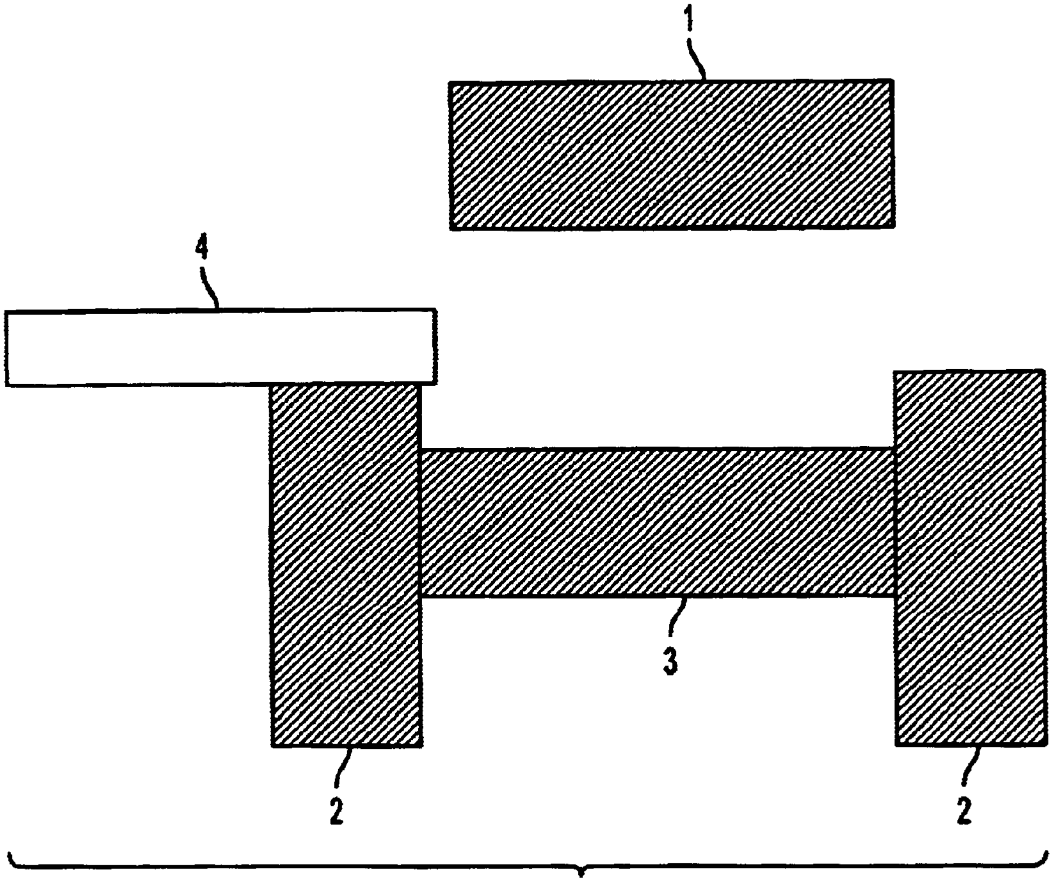
FIG. 11: Illustrates schematically a mold structure which can be used in the invention.
Figure 12A:
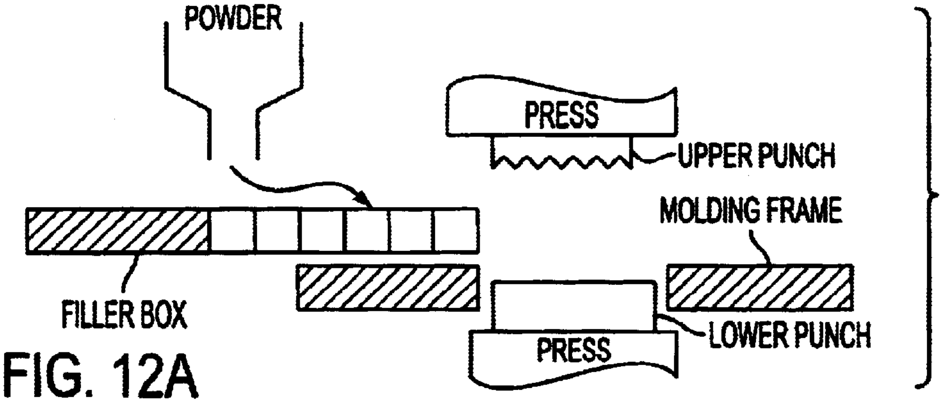
FIG. 12: Illustrates a schematic of the steps of the manufacturing process.
Figure 12B:
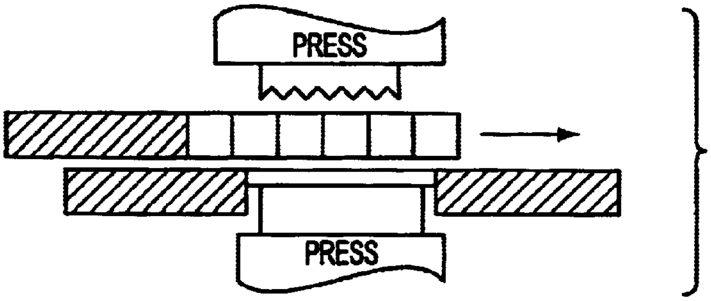
Figure 12C:
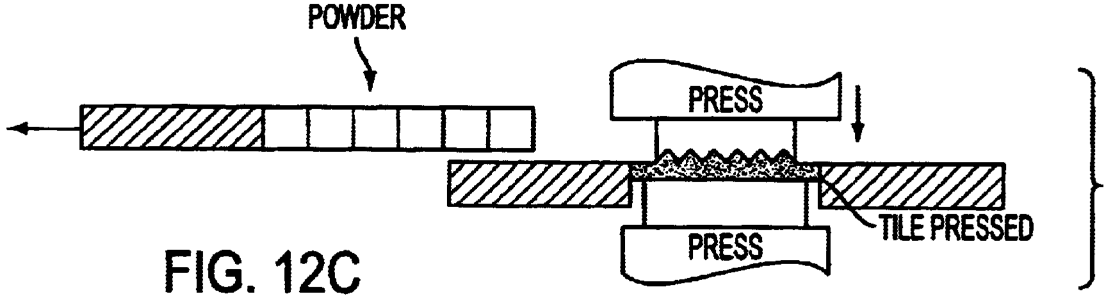
Figure 12D:
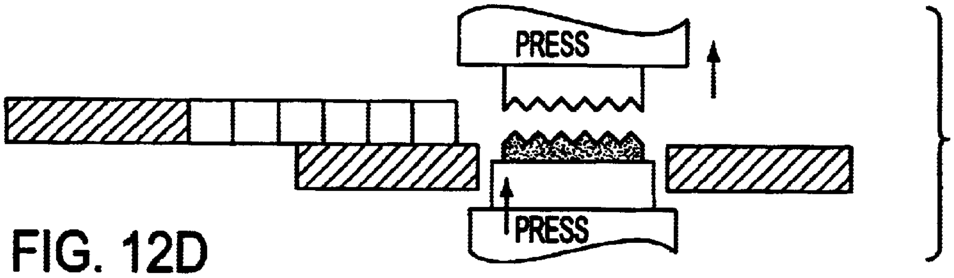
Figure 12E:
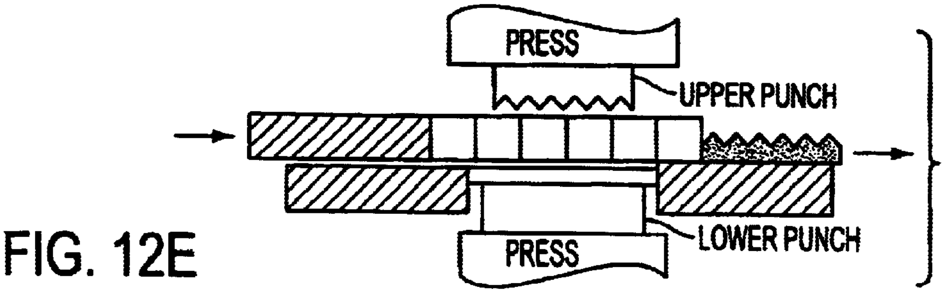

The mold press should have enough tonnage to press the powder composition with at least 350 kg/cm$^2$ (5000 lbs/in$^2$) specific pressure. The mold comprises four main components: (1) an upper punch, (2) a molding frame, (3) a lower punch, and (4) a filler box, as illustrated in FIG. 11. The pressing process comprises the steps of:

(a) filling the filler box (4) with a suitable powder composition, (b) pushing the filler box (4) forward to load the cavity of the molding frame (2) with the powder, (b1) pushing the filler box (4) back to its original position, (c) pressing the upper punch (1) down to compact the powder in the cavity of the molding frame (2), (d) raising the upper punch (1), lifting the lower punch (3) to the level of the top of the molding frame (2), and filling the filler box (4) with a suitable powder composition, (e) pushing the filler box (4) forward to slide the pressed tile from the molding frame (2) and filling the cavity of the molding frame with the powder.

The pressing process can reset and start again if desired, as illustrated in FIG. 12. The spike indentations should preferably be included on the upper punch (1) to avoid rounding of the spikes during extraction of the pressed tile from the molding frame (2).

The resulting anti-slip floor tiles have high slip resistance coefficients and retain their anti-slip characteristics after wear. Without wishing to be bound by any theory of operability, it is believed that the tiles of the present invention obtain high slip resistance through a textured pattern formed as part of the tile surface without the addition of foreign particles. In a preferred embodiment of the invention, the textured pattern is substantially uniform. The term "substantially uniform" means that the spikes are spaced in an ordered pattern such that the tiles produce an adequate slip resistance coefficient. The tiles of the present invention have high slip resistance coefficients relative to other textured prior art tiles. Furthermore, the tiles of the present invention do not lose their slip resistance with wear, as easily as the tiles of the prior art tend to do and maintain slip resistance coefficients above the minimum of 0.20 to 0.25 required to prevent slipping.

The invention will be further illustrated with reference to the following illustrative examples of embodiments thereof and comparative prior art examples.

Table 1 shows the slip resistance coefficients ("slip resistance") of some typical prior art examples. The prior art examples are tiles textured in some form to provide for anti-slip properties, but none of these tiles possess the pattern and the spikes of the present invention.

Table 2 shows the slip resistance coefficients of tiles of some preferred embodiments of the invention. The spikes of these tiles are pyramidal in shape and comprise eight faces.

Table 3 shows the slip resistance coefficients of tiles of the preferred embodiments of the invention represented in Table 2, after simulated wear. The tiles were abraded with 1500 revolutions using the PEI wet method, which is described in ASTM C-1027-84 (re-approved in 1990). FIGS. 2A–5E illustrate the specifics of the tiles represented in Tables 2 and 3. Again, the spikes of these tiles are pyramidal in shape and comprise eight faces. The height and base width of the individual spikes vary as indicated in Tables 2–3 and FIGS. 2A–5E.

Table 4 shows the slip resistance coefficients of anti-slip tiles of the invention with varying spike heights. The tiles had pyramid shaped spikes with eight faces ranging in height from 0.6 mm to 1.5 mm and with the base width of the spikes varying such that the spike angle was kept constant at 120°.

Table 5 shows the slip resistance coefficients of the series of anti-slip tiles of the invention having spikes ranging in height from 0.6 mm to 1.5 mm after wear. The tiles were abraded with 1500 revolutions using the PEI wet method.

FIGS. 6A–9E illustrate the specifics of the tiles represented in Tables 4 and 5. Again the spikes of these tiles are pyramidal in shape and comprise eight faces.

Table 6 shows the slip resistance coefficients of anti-slip tiles of the invention with flat-top spikes. The tiles had pyramid shaped spikes with eight faces.

Table 7 shows the slip resistance coefficients of the series of anti-slip tiles of the invention having flat-top spikes after wear. The tiles were abraded with 1500 revolutions using the PEI wet method.

FIGS. 10A–10D illustrate the specifics of the tiles represented in Tables 6 and 7. Again the spikes of these tiles are flat-top spikes which are pyramidal in shape and comprise eight faces.

The slip resistance coefficients were determined under simulated restaurant conditions using the Brungraber Mark II slip tester according to the ASTM Standard F-1677-96. The Mark II is one of only two available devices which are capable of accurately measuring the true slip resistance of tiles which are greasy and/or wet. The test is performed by applying both horizontal and vertical forces simultaneously. Additionally, the test is conducted under four different surface conditions: dry; wet; greasy; and greasy/wet. Older test methods, such as the James Machine and horizontal pull meters, have substantial time delays between horizontal and vertical force application, which prevents liquid planing (e.g., hydro-planing wherein the liquid is water) and causes exaggerated and misleadingly high results under wet and greasy conditions. This makes it difficult, if not impossible, to measure the true potential for slips on a wet/greasy tile surface with those methods.

Four different shoe bottom materials were used in each test. Standard Neolite was selected as a universal testing material. The surface of the Neolite was sanded between tests with 400 grit sandpaper to provide a uniform surface throughout and to offset the effects of repeated contact with the highly abrasive tile surfaces. A Reebok shoe sole (Shore-A hardness 68) was selected as a representative shoe type worn by restaurant customers and employees. A high heel shoe sole with a used heel (Shore-A hardness 92) was included due to its high likelihood of slipping and its prevalent use by restaurant customers. Finally, a used Nike shoe sole (Shore-A hardness 64) was selected as a second representative shoe type worn by restaurant customers and employees.

Again, a minimum slip resistance coefficient of approximately 0.20 to 0.25 is required to prevent slipping. As Tables 1 and 2 demonstrate, the anti-slip tiles of the present invention have slip resistance coefficients significantly higher than those of prior art textured tiles, particularly under greasy/wet conditions. Furthermore, as Table 3 shows, the anti-slip tiles of the invention maintain slip resistance coefficients well above the required minimum, even after wear. A comparison of Table 1 and Table 3 illustrates that even after wear, the anti-slip tiles of the present invention retain slip resistance coefficients generally higher than those of the unworn prior art tiles. Additionally, Tables 4 and 5 demonstrate the effect of spike height on slip resistance coefficient. Both tables show that as spike height increases, slip resistance coefficient increases. Again, a comparison of Table 1 and Table 5 illustrates that even after wear, the anti-slip tiles of the invention retain slip resistance coefficients generally higher than those of the unworn prior art tiles. Finally, Tables 6 and 7 demonstrate the efficacy of substantially flat-top spikes, before simulated wear (Table 6) and after simulated wear (Table 7), as compared to the tiles detailed in Tables 2 and 3, in which the spikes were not truncated. The tiles were abraded as described above in connection with Table 3 data to produce simulated wear. As shown in Tables 6 and 7, the tiles with substantially flat-top spikes had decreased slip resistance (as compared to the tiles in Tables 2 and 3). With the exception of high heel tests, all tiles in Tables 6 and 7 have slip resistance coefficients within the acceptable range. For many high heel tests, slip resistance coefficient was below 0.20.

TABLE 1

COMPARATIVE EXAMPLES

| TILE | SHOE | SLIP RESISTANCE COEFFICENT Dry | Wet | Greasy | Greasy/Wet |
|---|---|---|---|---|---|
| Flame Stone | Neolite | .79 | .765 | .46 | .33 |
| | Reebok | .63 | .625 | .535 | .525 |
| | High Heel | .30 | .28 | .21 | .205 |
| | Nike | 1.05 | .49 | .215 | .21 |
| Slate | Neolite | .84 | .68 | .51 | .345 |
| | Reebok | .62 | .61 | .50 | .495 |
| | High Heel | .395 | .32 | .26 | .255 |
| | Nike | 1.07 | .545 | .24 | .23 |
| Cross Dot | Neolite | .85 | .78 | .44 | .39 |
| | Reebok | .73 | .725 | .57 | .565 |
| | High Heel | .37 | .35 | .31 | .295 |
| | Nike | .98 | .51 | .27 | .26 |
| Cross Tread | Neolite | .78 | .765 | .42 | .39 |
| | Reebok | .615 | .61 | .53 | .525 |
| | High Heel | .285 | .27 | .215 | .205 |
| | Nike | .95 | .47 | .26 | .25 |
| Grip | Neolite | 1.08 | 1.01 | .69 | .44 |
| | Reebok | .67 | .66 | .60 | .59 |
| | High Heel | .37 | .365 | .36 | .355 |
| | Nike | 1.02 | .78 | .27 | .25 |
| New Unused Daltile | Neolite | .73 | .58 | .42 | .21 |
| American Olean | Reebok | .49 | .48 | .395 | .385 |
| Smooth Quarry Tile | High Heel | .26 | .245 | .255 | .235 |
| | Nike | .94 | .53 | .235 | .19 |
| Smooth Quarry | Neolite | .69 | .41 | .265 | .115 |
| -used | Reebok | .375 | .36 | .30 | .28 |
| | High Heel | .21 | .19 | .165 | .115 |
| | Nike | .90 | .51 | .195 | .13 |
| Unused Daltile | Neolite | .87 | .86 | .475 | .465 |
| Abrasive Quarry | Reebok | .495 | .485 | .405 | .395 |
| Tile | High Heel | .42 | .40 | .255 | .235 |
| | Nike | .96 | .77 | .28 | .21 |
| New Unused Imola | Neolite | .72 | .46 | .215 | .155 |
| Top Rustico R211 | Reebok | .51 | .50 | .425 | .415 |
| Porcelain Tile | High Heel | .235 | .22 | .205 | .20 |
| | Nike | .92 | .49 | .195 | .19 |

TABLE 2

ANTI-SLIP TILE RESULTS

| TILE (height/width, mm) | SHOE | SLIP RESISTANCE COEFFICENT Dry | Wet | Greasy | Greasy/Wet |
|---|---|---|---|---|---|
| 1.2/1.73 | Neolite | 1.08+ | 1.08+ | 1.08+ | 1.08+ |
| | Reebok | 1.08+ | 1.08+ | 1.08+ | 1.03 |
| | High Heel | .70 | .69 | .67 | .62 |
| | Nike | 1.08+ | 1.08+ | .72 | .62 |

TABLE 2-continued

ANTI-SLIP TILE RESULTS

| TILE (height/width, mm) | SHOE | SLIP RESISTANCE COEFFICENT Dry | Wet | Greasy | Greasy/Wet |
|---|---|---|---|---|---|
| 1.2/2.078 | Neolite | 1.08+ | 1.08+ | .96 | .75 |
| | Reebok | .90 | .89 | .79 | .76 |
| | High Heel | .68 | .67 | .65 | .59 |
| | Nike | 1.08+ | 1.08+ | .60 | .50 |
| 1.2/2.428 | Neolite | 1.03 | 1.00 | .84 | .61 |
| | Reebok | .84 | .83 | .75 | .72 |
| | High Heel | .51 | .49 | .50 | .43 |
| | Nike | 1.08+ | 1.08+ | .40 | .38 |
| 1.2/2.775 | Neolite | .90 | .86 | .77 | .56 |
| | Reebok | .80 | .78 | .61 | .58 |
| | High Heel | .43 | .41 | .44 | .38 |
| | Nike | .99 | .88 | .35 | .33 |

TABLE 3

WEAR OF ANTI-SLIP TILE RESULTS

| TILE (height/width, mm) | SHOE | SLIP RESISTANCE COEFFICENT Dry | Wet | Greasy | Greasy/Wet |
|---|---|---|---|---|---|
| 1.2/1.73 | Neolite | 1.08+ | 1.08+ | .60 | .57 |
| | Reebok | .73 | .72 | .53 | .52 |
| | High Heel | .48 | .435 | .41 | .39 |
| | Nike | 1.08+ | 1.00 | .345 | .31 |
| 1.2/2.078 | Neolite | 1.08+ | 1.08+ | .51 | .475 |
| | Reebok | .72 | .71 | .52 | .51 |
| | High Heel | .475 | .43 | .39 | .37 |
| | Nike | 1.08+ | .99 | .335 | .305 |
| 1.2/2.428 | Neolite | .995 | .98 | .57 | .53 |
| | Reebok | .71 | .70 | .60 | .59 |
| | High Heel | .47 | .43 | .43 | .415 |
| | Nike | 1.08+ | .90 | .315 | .285 |
| 1.2/2.775 | Neolite | .885 | .85 | .455 | .42 |
| | Reebok | .71 | .69 | .51 | .50 |
| | High Heel | .41 | .40 | .38 | .36 |
| | Nike | .98 | .88 | .31 | .28 |

TABLE 4

HEIGHT STUDIES - ANTI-SLIP TILE RESULTS

| TILE (height/width, mm) | SHOE | SLIP RESISTANCE Dry | Wet | Greasy | Greasy/Wet |
|---|---|---|---|---|---|
| 1.5/1.7315 | Neolite | 1.08+ | 1.08+ | 1.08+ | 1.08+ |
| | Reebok | 1.08+ | 1.08+ | 1.08+ | 1.08+ |
| | High Heel | .58 | .57 | .57 | .52 |
| | Nike | 1.08+ | 1.08+ | .86 | .76 |
| 1.2/1.3857 | Neolite | 1.08+ | 1.08+ | 1.08+ | 1.08+ |
| | Reebok | 1.08+ | 1.08+ | 1.01 | .98 |
| | High Heel | .55 | .54 | .54 | .48 |
| | Nike | 1.08+ | 1.08+ | .82 | .70 |
| 0.9/1.0389 | Neolite | 1.08+ | 1.08+ | 1.08+ | 1.08+ |
| | Reebok | .92 | .91 | .83 | .81 |
| | High Heel | .54 | .52 | .53 | .47 |
| | Nike | 1.08+ | 1.08+ | .68 | .56 |
| 0.6/0.6928 | Neolite | 1.08+ | 1.08+ | 1.08+ | 1.08+ |
| | Reebok | .88 | .86 | .66 | .64 |
| | High Heel | .53 | .51 | .52 | .46 |
| | Nike | 1.01 | .90 | .43 | .35 |

TABLE 5

HEIGHT STUDIES - WEAR OF ANTI-SLIP TILE RESULTS

| TILE (height/width, mm) | SHOE | SLIP RESISTANCE Dry | Wet | Greasy | Greasy/Wet |
|---|---|---|---|---|---|
| 1.5/1.7315 | Neolite | 1.08+ | 1.08+ | .77 | .72 |
| | Reebok | .97 | .95 | .70 | .69 |
| | High Heel | .56 | .55 | .51 | .49 |
| | Nike | 1.08+ | 1.04 | .47 | .45 |
| 1.2/1.3857 | Neolite | 1.08+ | 1.08+ | .67 | .63 |
| | Reebok | .96 | .94 | .61 | .60 |
| | High Heel | .53 | .52 | .46 | .44 |
| | Nike | 1.08+ | 1.01 | .42 | .39 |
| 0.9/1.0389 | Neolite | 1.08+ | 1.08+ | .59 | .53 |
| | Reebok | .77 | .75 | .48 | .47 |
| | High Heel | .46 | .44 | .41 | .38 |
| | Nike | 1.08+ | .97 | .30 | .26 |
| 0.6/0.6928 | Neolite | 1.08+ | 1.08+ | .48 | .41 |
| | Reebok | .52 | .50 | .37 | .35 |
| | High Heel | .39 | .37 | .36 | .33 |
| | Nike | .76 | .82 | .26 | .23 |

TABLE 6

FLAT-TOP ANTI-SLIP TILE RESULTS

| TILE (height/width, mm) | SHOE | SLIP RESISTANCE COEFFICENT Dry | Wet | Greasy | Greasy/Wet |
|---|---|---|---|---|---|
| 0.91.73 | Neolite | 1.08+ | 1.08+ | .60 | .56 |
| | Reebok | .65 | .64 | .64 | .63 |
| | High Heel | .325 | .31 | .32 | .31 |
| | Nike | 1.04 | .94 | .67 | .60 |
| 0.9/2.08 | Neolite | .92 | .88 | .51 | .34 |
| | Reebok | .585 | .58 | .51 | .50 |
| | High Heel | .19 | .18 | .16 | .155 |
| | Nike | .925 | .83 | .58 | .48 |
| 0.9/2.43 | Neolite | .87 | .83 | .385 | .24 |
| | Reebok | .53 | .52 | .49 | .48 |
| | High Heel | .18 | .18 | .14 | .13 |
| | Nike | .83 | .725 | .495 | .465 |
| 0.9/2.78 | Neolite | .82 | .78 | .38 | .235 |
| | Reebok | .515 | .51 | .475 | .47 |
| | High Heel | .185 | .17 | .175 | .165 |
| | Nike | .73 | .64 | .485 | .45 |

TABLE 7

WEAR OF FLAT-TOP ANTI-SLIP TILE RESULTS

| TILE (height/width, mm) | SHOE | SLIP RESISTANCE COEFFICENT Dry | Wet | Greasy | Greasy/Wet |
|---|---|---|---|---|---|
| 0.9/1.73 | Neolite | 1.08+ | 1.08+ | .51 | .47 |
| | Reebok | .64 | .63 | .57 | .56 |
| | High Heel | .42 | .41 | .41 | .40 |
| | Nike | .93 | .83 | .53 | .47 |
| 0.9/2.08 | Neolite | .91 | .86 | .48 | .31 |
| | Reebok | .52 | .51 | .50 | .495 |
| | High Heel | .21 | .20 | .205 | .195 |
| | Nike | .89 | .80 | .485 | .43 |
| 0.9/2.43 | Neolite | .86 | .80 | .37 | .22 |
| | Reebok | .46 | .45 | .455 | .45 |
| | High Heel | .125 | .12 | .12 | .115 |
| | Nike | .82 | .72 | .43 | .40 |
| 0.9/2.78 | Neolite | .82 | .76 | .36 | .21 |
| | Reebok | .43 | .42 | .45 | .44 |
| | High Heel | .13 | .12 | .145 | .135 |
| | Nike | .71 | .62 | .41 | .39 |

The invention has been described in general terms and illustrated by some specific examples. It is to be understood that the methods and embodiments within the spirit of this invention which are equivalent to those specifically described are considered to be within the scope of the invention. That scope is defined by the appended claims.

What is claimed is:

1. An anti-slip floor tile which comprises a tile including a top surface which is textured with a pattern of spikes and which has a minimum slip resistance of approximately 0.20 when tested under greasy and wet conditions as measured by the American Society for Testing and Materials, Standard Testing Procedure F-1677-96 wherein the spikes range from about 0.2 to about 3.0 mm in height and from about 0.8 to about 3.0 mm in base width or diameter.

2. The anti-slip floor tile of claim 1 which has a slip resistance of at least about 0.25.

3. The anti-slip floor tile of claim 1 which has a slip resistance of at least about 0.35

4. The anti-slip floor tile of claim 1 wherein the spikes are made of the same material as the tile.

5. The anti-slip floor tile of claim 1 wherein the pattern of spikes is substantially uniform.

6. The anti-slip floor tile of claim 1 wherein the spikes are pyramidal or conical in shape.

7. The anti-slip floor tile of claim 1, wherein the spikes are pyramidal in shape and comprise at least three faces.

8. The anti-slip floor tile of claim 1 wherein the spikes are pyramidal in shape and comprise eight faces.

9. The anti-slip floor tile of claim 1 wherein the spikes are substantially flat-top pyramidal or substantially flat-top conical in shape.

10. The anti-slip floor tile of claim 1, 6, 7, 8, or 9 wherein the spikes range from about 0.6 to about 3.0 mm in height and from about 0.8 to about 3.0 mm in base width or diameter.

11. The anti-slip floor tile of claim 1 wherein the tile and the spikes are formed from a ceramic composition.

12. The anti-slip floor tile of claim 1 wherein the tile and the spikes are formed from a composition comprising a mixture of clay, china-clay, feldspar, and silica.

13. The anti-slip floor tile of claim 1 or 6 wherein the distance between spikes is between about 5 mm and 20 mm.

14. The anti-slip floor tile of claim 13 wherein said distance between spikes is 11 mm.

15. The anti-slip floor tile of claim 4 wherein said tile is made from fiberglass or ceramic.

16. The anti-slip floor tile of claim 15 wherein said tile is made from porcelain.

17. The anti-slip floor tile of claim 6 wherein the spike angle is between 105 and 150 degrees.

18. The anti-slip floor tile of claim 6 wherein the height of the spikes is 1.2 mm and the base width is selected from 1.73 mm, 2.078, 2.428 mm, and 2.775 mm.

19. The anti-slip floor tile of claim 6, wherein the height of the spikes is 0.9 mm and the base width is selected from 1.73 mm, 2.08 mm, 2.43 mm, and 2.78 mm.

20. The anti-slip floor tile of claim 9, wherein said flat-top pyramidal spikes have a planar surface winch is either parallel to the base or inclined at an angle between 5 and 70 degrees.

21. The anti-slip floor tile of claim 1, wherein the height of a spike is about 1.2 mm and the diameter or base width is about 2.078 mm.

22. The anti-slip floor tile of claim 1, wherein the floor tile retains said minimum slip resistance after 1500 revolutions when tested with a PEI wet method.

* * * * *